(12) United States Patent
Arora et al.

(10) Patent No.: US 12,470,563 B2
(45) Date of Patent: Nov. 11, 2025

(54) SYSTEM AND METHOD FOR PROCESSING RESTRICTION-BASED INTERACTIONS BY PERFORMING MULTIPLE ENTITY VALIDATIONS

(71) Applicant: BANK OF AMERICA CORPORATION, Charlotte, NC (US)

(72) Inventors: Saurabh Arora, Haryana (IN); Sandeep Kumar Chauhan, Telangana (IN); Ravikiran Subramanya Rao, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 59 days.

(21) Appl. No.: 18/611,419

(22) Filed: Mar. 20, 2024

(65) Prior Publication Data

US 2025/0300988 A1    Sep. 25, 2025

(51) Int. Cl.
*H04L 9/40*    (2022.01)
(52) U.S. Cl.
CPC .................................. *H04L 63/102* (2013.01)
(58) Field of Classification Search
None
See application file for complete search history.

(56) References Cited

U.S. PATENT DOCUMENTS

| | | | |
|---|---|---|---|
| 6,931,382 B2* | 8/2005 | Laage | G06Q 20/382 705/64 |
| 7,866,551 B2* | 1/2011 | Manessis | G06Q 20/20 235/382 |
| 9,280,765 B2* | 3/2016 | Hammad | G06Q 20/3674 |
| 2004/0104266 A1* | 6/2004 | Bolle | G07C 9/37 235/382 |
| 2009/0157519 A1* | 6/2009 | Bishop | G06Q 20/20 705/19 |
| 2009/0164327 A1* | 6/2009 | Bishop | G06Q 20/02 705/19 |
| 2012/0143752 A1* | 6/2012 | Wong | G06Q 20/4012 705/41 |
| 2016/0080944 A1* | 3/2016 | Colegate | H04L 63/06 455/410 |
| 2020/0202376 A1* | 6/2020 | Benoliel | H04W 4/029 |
| 2025/0190966 A1* | 6/2025 | Gutierrez-Sheris | G06Q 20/02 |

* cited by examiner

*Primary Examiner* — Kaveh Abrishamkar
(74) *Attorney, Agent, or Firm* — Moore & Van Allen PLLC; Anoohya Yarlagadda (57) ABSTRACT

Embodiments of the invention are directed to systems, methods and computer program products for processing restriction-based interactions by performing multiple entity validations. The invention may identify initiation of a resource interaction at a point of interaction device by a user, cause the point of interaction device to perform a registered restriction check on the resource interaction to check for one or more registered restrictions, identify at least one registered restriction associated with the resource interaction based on performing the registered restriction check, perform consolidated multiple entity validations associated with the at least one registered restriction by communicating with multiple entities associated with processing the resource interaction, determine if the multiple entity validations are successful, and allow or deny the resource interaction based at least in part on determining if the multiple entity validations are successful.

20 Claims, 6 Drawing Sheets

SYSTEM AND METHOD FOR PROCESSING RESTRICTION-BASED INTERACTIONS BY PERFORMING MULTIPLE ENTITY VALIDATIONS

BACKGROUND OF THE INVENTION

There exists a need for a system for processing restriction-based interactions by performing multiple entity validations.

BRIEF SUMMARY OF THE INVENTION

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In general, embodiments of the invention are directed to systems, methods and computer program products for processing restriction-based interactions by performing multiple entity validations. In some embodiments, a system may include a computing platform including a memory device storing a plurality of computer instructions, and at least one electronic processor (e.g., a computing processor) in communication with the memory, where the at least one electronic processor may be configured to execute the computer instructions. Based on executing the computer instructions, the system may perform one or more actions. For example, in some embodiments, the system may identify initiation of a resource interaction at a point of interaction device by a user, cause the point of interaction device to perform a registered restriction check on the resource interaction to check for one or more registered restrictions, identify at least one registered restriction associated with the resource interaction based on performing the registered restriction check, perform consolidated multiple entity validations associated with the at least one registered restriction by communicating with multiple entities associated with processing the resource interaction, determine if the multiple entity validations are successful, and allow or deny the resource interaction based at least in part on determining if the multiple entity validations are successful.

In some embodiments, the system may perform a dynamic post-registration restriction check by communicating with the multiple entities associated with processing the resource interaction and determine if the post-registration restriction check is successful to allow or deny the resource interaction.

In some embodiments, the post-registration restriction check is associated with post-registration restrictions that are identified at a timestamp after completion of registration process associated with the one or more registered restrictions.

In some embodiments, the system may perform the post-registration restriction check based on communicating with the multiple entities in real-time to identify any real-time post-registration restrictions.

In some embodiments, the system may perform the consolidated multiple entity validations based on extracting restriction information associated with the at least one registered restriction from an entity of the multiple entities associated with the at least one registered restriction, wherein the restriction information comprises at least one or more interaction conditions and validating if the resource interaction satisfies the one or more interaction conditions by extracting real-time data associated with the one or more interaction conditions and the resource interaction from the multiple entities.

In some embodiments, the one or more interaction conditions are placed by the entity associated with the at least one registered restriction based on at least one of user provided rules, location based regulations, product based regulations, service based regulations, interaction trends, and organization rules associated with the entity.

In some embodiments, the system may extract data associated with interaction restrictions from the multiple entities and third party entities, formulate one or more restrictions based on the data; and register the one or more restrictions as the one or more registered restrictions.

The features, functions, and advantages that have been discussed may be achieved independently in various embodiments of the present invention or may be combined with yet other embodiments, further details of which can be seen with reference to the following description and drawings.

In addition to the discussed system, any of the functions, operations, or steps described herein may also be performed via a computer implemented method or via computer program product being performed by one or more computer processors.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" or "interaction" or "resource interaction" refers to any communication between a user, a financial institution, and/or another entity (e.g., a merchant) to transfer resources (e.g., funds, credit, and/or the like) for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In various embodiments, a point-of-transaction device (POT) may be or include a merchant machine and/or server and/or may be or include the mobile device of the user, which may function as a point of transaction device. The embodiments described herein may refer to the use of a transaction, transaction event or point of transaction event to trigger the steps, functions, routines or the like described herein. In various embodiments, occurrence of a transaction triggers the sending of a distribution request or transaction request including information identifying a resource distribution device (e.g., a payment card, such as a credit card, debit card, gift card, and/or the like, a mobile device running an electronic payment operation, such as a remote wallet, an near-field communication (NFC) based payment, and/or the like). As used herein, a "bank account" refers to a credit account, a debit/deposit account, and/or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, and/or the like. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to a technology activity such as an event and/or action or group of actions facilitated or performed by a user's device, such as a user's mobile device. Such a device may be referred to herein as a "point-of-transaction device." A "point-of-transaction" may refer to any location, virtual location or otherwise proximate occurrence of a transaction. A "point-of-transaction device" or "resource distribution device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. In some embodiments, a point-of-transaction device and/or a resource distribution device may be or may include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal global positioning system (GPS) device, or the like), a merchant terminal, a self-service machine (e.g., vending machine, self-checkout machine, or the like), a public and/or business kiosk (e.g., an Internet kiosk, ticketing kiosk, bill pay kiosk, or the like), an entertainment device, and/or various combinations of the foregoing.

Further, the term "payment credential," "payment vehicle," and/or "resource distribution device" as used herein, may refer to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the resource distribution device is a bank card issued by a bank which a customer may use to perform purchase transactions. However, in other embodiments, the resource distribution device is a virtual debit card housed in a mobile device of the customer, which can be used to electronically interact with an ATM or the like to perform financial transactions. Thus, it will be understood that the resource distribution device can be embodied as an apparatus (e.g., a physical card, a mobile device, or the like), or as a virtual transaction mechanism (e.g., a digital transaction device, digital wallet, a virtual display of a transaction device, or the like). The resource distribution device may be an unrestricted resource. Unrestricted resources, as used herein may be any resource that is not restricted to transaction. In this way, the unrestricted resources may be applied to any transaction for purchase of a product or service.

In some embodiments, an "entity" may refer to a financial institution. In some embodiments, a "financial institution" may be any organization, entity, or the like in the business of moving, investing, or lending money, dealing in financial instruments, or providing financial services. This may include commercial banks, thrifts, federal and state savings banks, savings and loan associations, credit unions, investment companies, insurance companies, and/or the like. In some embodiments, a financial institution may allow a user to establish an account with the financial institution. An "account" may be the relationship that the user has with the financial institution. Examples of accounts include a deposit account, such as a transactional account (e.g., a banking account), a savings account, an investment account, a money market account, a time deposit, a demand deposit, a pre-paid account, a credit account, a non-monetary user account that includes only personal information associated with the user, and/or the like. The account is associated with and/or maintained by the financial institution. In other embodiments, an entity may not be a financial institution. In still other embodiments, the entity may be the merchant itself. In some embodiments, the "user" may be a customer (e.g., an account holder or a person who has a third party mobile wallet system associated with his/her mobile device). In some other embodiments, the entity may be any entity involved in processing of the transactions. Examples of such entities may include, but are not limited, user financial institution, merchant financial institution, merchant, payment issuers, payment acquirers, card networks, third party payment processors, and/or the like There may be some transaction restrictions in place, where the restrictions may comprise merchant based restrictions, product based restrictions, user based restrictions, location based restrictions, and/or the like. By allowing such transactions with restrictions, the entities involved in processing the transactions may face compliance issues. Additionally to process such restrictions, all of the entities involved in processing the transactions may not have all the information associated with the restrictions and enforcing the restrictions, thereby making it difficult to effectively process transactions with restrictions. As such, there exists a need for a system to effectively process restriction-based transactions.

Additionally, a user may attempt to distribute resources from a source to an entity by providing the entity with information regarding the resources and the source. The entity may provide a distribution request, including the information, to a resource management entity. If the source does not have enough resources to satisfy the distribution request, the resource management entity may deny the distribution request. However, denied distribution requests consume computing resources (e.g., processing resources, memory resources, power resources, communication resources, and/or the like) and/or network resources associated with receiving information from the user, providing the distribution request to the resource management entity, processing the distribution request (e.g., by the resource management entity), notifying the entity that the distribution request is denied, and/or the like. Furthermore, after a denied distribution request, the user may attempt to distribute resources from another source to the entity, and the entity may provide another distribution request to another resource management entity. Repeated distribution requests, for a single effort to complete a resource distribution, also consume computing resources (e.g., processing resources, memory resources, power resources, communication resources, and/or the like) and/or network resources.

Embodiments of the invention are directed to systems, methods, and computer program products for processing restriction-based transactions. For a given transaction request (e.g., a distribution request), a resource management system (e.g., a system operated by a financial institution for processing payments, maintaining account balances, and/or the like) may determine whether the given transaction request is associated with any restrictions (e.g., merchant based restrictions, product based restrictions, user based restrictions, location based restrictions, and/or the like) by performing validations with multiple entities involved (e.g., merchant, issuing network, acquirer network, and/or the like) to process the transaction request.

Upon determining that at least a part of the transaction request is not associated with any restrictions, the resource management system may then determine whether a source (e.g., an account) associated with a resource distribution device (e.g., a payment vehicle, a credit/debit card, and/or the like) provided by a user to an entity (e.g., a merchant) to complete the transaction has enough resources to complete the transaction. In some embodiments, if the source associated with the resource distribution device does not have enough resources to complete the transaction, the resource management system may determine whether one or more other sources (e.g., other accounts) associated with the user have enough resources to complete the transaction. If the one or more other sources have enough resources to complete the transaction, the resource management system may distribute the requested amount of resources to the entity.

In this way, the resource management system may ensure compliance and also reduce a number of and/or eliminate denied distribution requests. By reducing the number of and/or eliminating denied distribution requests, the resource management system may conserve computing resources (e.g., processing resources, memory resources, power resources, communication resources, and/or the like) and/or network resources that would otherwise be consumed by receiving information from the user, providing the distribution request to the resource management entity, processing the distribution request (e.g., by the resource management entity), notifying the entity that the distribution request is denied, repeated distribution requests, and/or the like.

Additionally, or alternatively, by distributing the requested amount of resources to the entity (e.g., from the one or more other sources) even though the source does not have enough resources to complete the transaction, the resources management system may prevent the user from providing another resource distribution device (e.g., a payment vehicle, a credit/debit card, and/or the like) associated with another resource management system (e.g., another financial institution) to complete the transaction. In this way, the resource management system may ensure that the transaction is completed using the resource management system and may improve user satisfaction with the resource management system (e.g., and a financial institution maintaining the resource management system).

Figure 1:
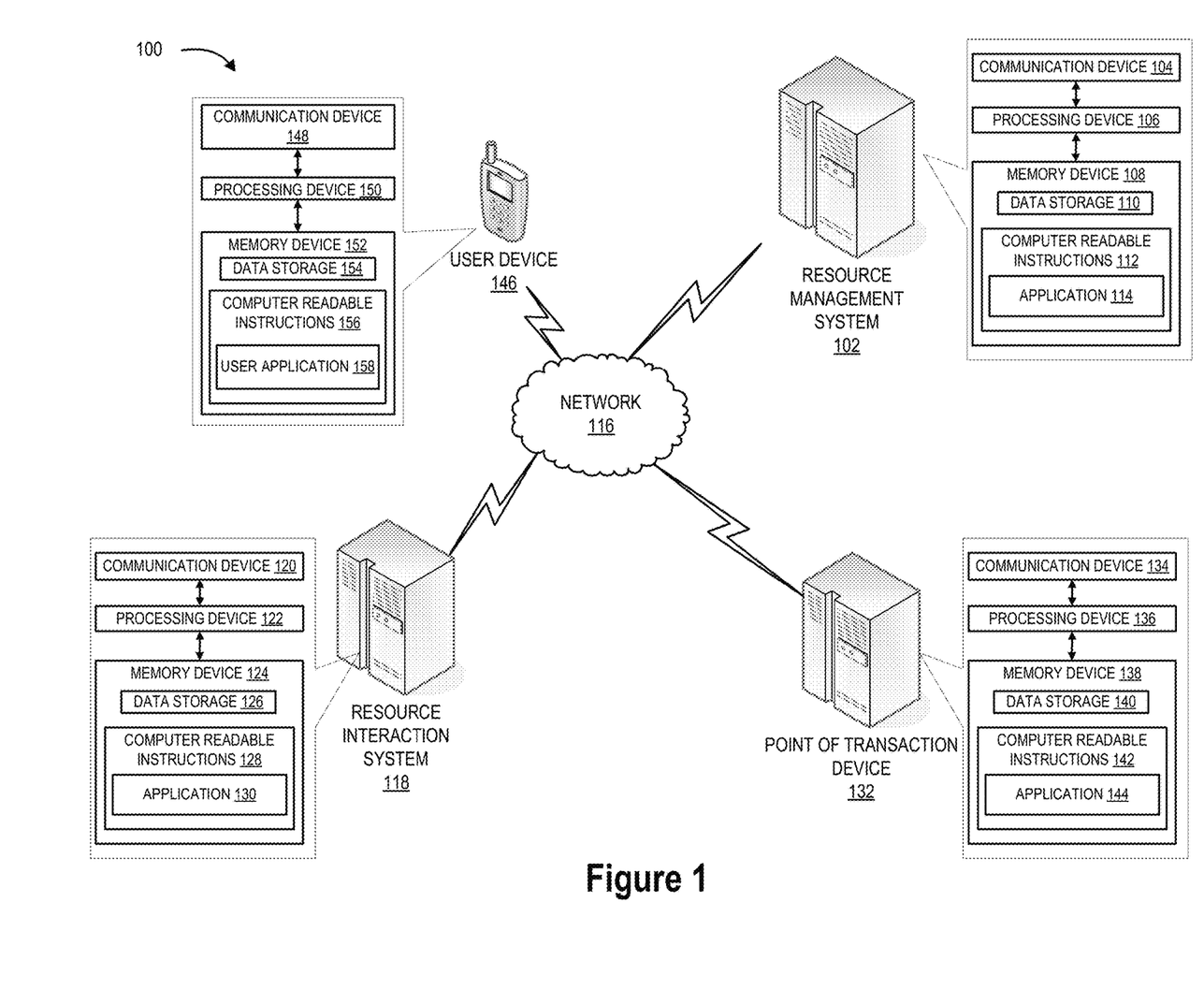
FIG. 1 is a schematic diagram of an exemplary embodiment of a network environment in which one or more embodiments of the present invention may operate.

FIG. 1 provides a system 100 for controlling communications and interaction with a resource interaction system 118, such as resource interaction system, card issuing network systems, acquirer server systems for examples, which are used to process payment transactions on a network (e.g., an electronic network) or series of networks. FIG. 1 provides a unique system that includes specialized servers and system communicably linked across a distributive network of nodes required to perform the functions described herein.

The resource management system 102 generally comprises a communication device 104, a processing device 106, and a memory device 108. As used herein, the term "processing device" generally includes circuitry used for implementing the communication and/or logic functions of the particular system. For example, a processing device may include a digital signal processor device, a microprocessor device, a computing processor, and various analog-to-digital converters, digital-to-analog converters, control units, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 106 is operatively coupled to the communication device 104 and the memory device 108. The processing device 106 uses the communication device 104 to communicate with at least one network 116 and other devices on the network 116, such as, but not limited to a resource interaction system 118, a point of transaction device 132, and/or a remote requesting system, such as a user device 146. As such, the communication device 104 generally comprises a modem, server, or other device for communicating with other devices on the network 116.

The resource management system 102 may be a system of the present invention. As further illustrated in FIG. 1, the resource management system 102 comprises computer-readable instructions 112 stored in the memory device 108, which in one embodiment includes the computer-readable instructions 112 of an application 114. In some embodiments, the memory device 108 includes data storage 110 for storing data related to the system environment, but not limited to data created and/or used by the application 114.

In one embodiment of the resource management system 102, the memory device 108 stores an application 114. In one embodiment of the invention, the application 114 may associate with applications having computer-executable program code. Furthermore, the resource management system 102, using the processing device 106 codes certain communication functions described herein. In one embodiment, the computer-executable program code of an application associated with the application 114 may also instruct the processing device 106 to perform certain logic, data processing, and data storing functions of the application. The processing device 106 is configured to use the communication device 104 to communicate with and ascertain data from one or more resource interaction systems 118, point-of-transaction devices 132, and/or remote requesting system, such as a user device 146.

In some embodiments, the resource interaction system 118 may include multiple systems (e.g., card networks, acquirer financial institution, issue financial institution, payment gateways, and/or the like) that are associated with processing the interactions. As illustrated in FIG. 1, the resource interaction system 118 is connected to the resource management system 102 via the network 116. The resource interaction system includes the same types of components as the resource management system 102, namely a communication device 120, processing device 122, memory device 124, data storage 126, computer readable instructions 128, and an application 130.

The resource interaction system is further equipped to communicate with various point of transaction devices 132, such as point of sale terminals at a merchant location or in a merchant's mobile vehicle or mobile location. The point of transaction devices may take various forms, but typically include the same types of components as the resource management system 102 and the resource interaction system 118, namely a communication device 134, processing device 136, memory device 138, data storage 140, computer readable instructions 142, and an application 144. In some embodiments, the application 144 may be provided by the resource management system 102, where the one or more executable instructions in the application 144 may perform one or more actions as described herein, where the one or more actions may be based on dynamic or real-time instructions provided by the resource management system 102.

Further, the resource interaction system is further equipped to communicate with various user devices 146, such as mobile phones, tablets, personal computers, wearables, and the like. Again, user devices may take various forms, but typically include the same types of components as the resource management system 102 and the resource interaction system 118, namely a communication device 148, processing device 150, memory device 152, data storage 154, computer readable instructions 156, and an application 158.

Figure 2:
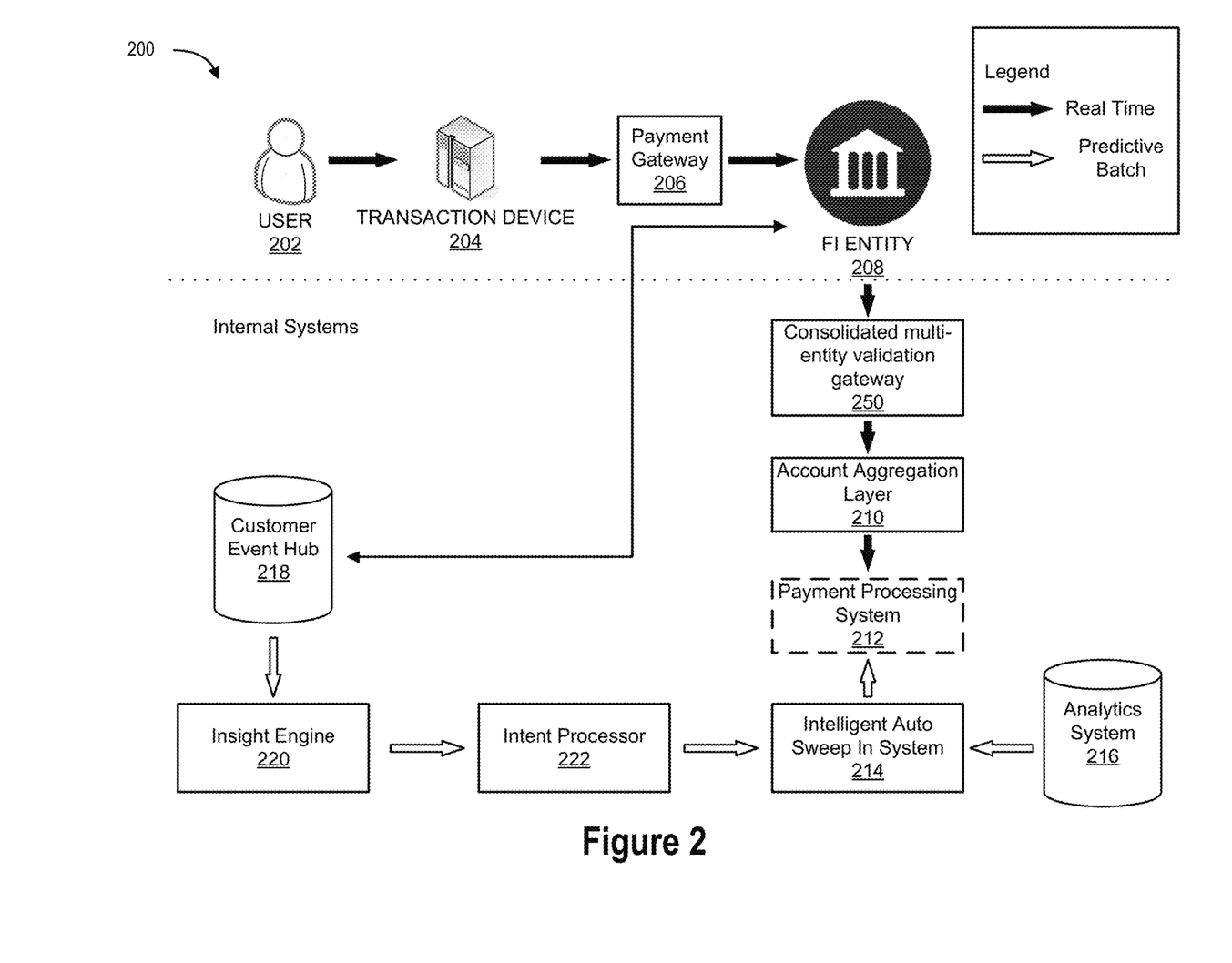
FIG. 2 is a schematic diagram of an example interaction process flow in accordance with one or more embodiments of the present invention.

FIG. 2 is a schematic diagram of an example transaction process flow 200 in accordance with one or more embodiments of the present invention. As shown in FIG. 2, a user 202 may initiate a resource distribution (e.g., a payment) at a transaction device 204 (e.g., which may be similar to point of transaction device 132 as shown in and described with respect to FIG. 1). For example, the user 202 may interact with the transaction device 204 using a payment vehicle (e.g., a resource distribution device).

As shown in FIG. 2, the transaction device 204 may generate a transaction request (e.g., a distribution request, a payment request, and/or the like) and transmit the transaction request to a payment gateway 206. For example, the transaction request may include information identifying the payment vehicle, a price of the transaction (e.g., a request amount of resources), products or services associated with the transaction (e.g., products or services that the user is purchasing from the merchant), and/or any other information associated with the transaction.

As shown in FIG. 2, the payment gateway 206 may receive the transaction request from the transaction device 204 and transmit the transaction request to a Financial entity 208 (e.g., bank). For example, the payment gateway 206 may process the information identifying the payment vehicle, determine, based on the information identifying the payment vehicle, that the bank 208 and/or an account at the bank 208 is associated with the payment vehicle, and transmit the transaction request to the bank 208.

As shown in FIG. 2, the bank 208 may include a number of internal systems, such as a consolidated multi-entity validation gateway 250, an account aggregation layer 210 and a payment processing system 212. For example, the bank 208 may maintain a resource management system, and the resource management system may include one or more of the internal systems shown in FIG. 2. As further shown in FIG. 2, after the bank 208 receives the transaction request, the consolidated multi-entity validation gateway 250 may perform restriction checks as described in FIG. 3. For example, the resource management system may perform multiple validations with multiple resource interaction systems 118 associated with performing multiple restriction checks and implementing restrictions to transactions (as explained in detail in FIG. 3). Once the restriction checks are complete, the account aggregation layer 210 may process the transaction request (e.g., before the transaction request is sent to the payment processing system 212). For example, a resource management system, using the account aggregation layer 210, may process the transaction request in a manner similar to that described herein with respect to FIG. 6B, and in some embodiments, may transfer funds (e.g., resources) between accounts associated with the payment vehicle. In some embodiments, the resource management system, using the account aggregation layer 210, may process the transaction request in a manner similar to that described herein with respect to FIG. 4 and/or FIG. 5.

As shown in FIG. 2, the transaction request may then be transmitted to the payment processing system 212. For example, the payment processing system 212 may process the transaction request and information regarding one or more accounts associated with the payment vehicle, complete the transaction with the merchant using funds from one or more accounts associated with the payment vehicle, may notify the merchant and/or the customer that the transaction was successful or that the transaction failed, and/or the like.

As noted by the legend in FIG. 2, the interactions between the user 202, the transaction device 204, the payment gateway 206, the bank 208, the consolidated multi-entity validation gateway 250, the account aggregation layer 210, and the payment processing system 212 may be conducted in real time. For example, each of the interactions may occur in real time after the user 202 initiates a payment at the transaction device 204.

As shown in FIG. 2, the internal systems of the bank 208 may also include an intelligent auto sweep in system 214, an analytics system 216, a customer event hub 218, an insight engine 220, and an intent processor 222. As noted by the legend in FIG. 2, the interactions between the intelligent auto sweep in system 214, the analytics system 216, the customer event hub 218, the insight engine 220, the intent processor 222, and the payment processing system 212 may be conducted as a predictive batch. For example, each of the interactions may occur in a predictive manner before the user 202 initiates a payment at the transaction device 204 and/or as soon as the user 202 initiates a payment at the transaction device 204.

In some embodiments, the analytics system 216 may provide input, such as customer specific thresholds, for the intelligent auto sweep in system 214. For example, the analytics system 216 may analyze a count of sweep-ins (e.g., a number of times the account aggregation layer and/or the intelligent auto sweep in system transfers money between accounts of a user to complete a transaction) for a user's accounts and/or for one or more interlinked accounts. In some embodiments, if the count of sweep-ins has reached above a threshold set by the user, then the analytics system 216 may provide a stop flag to the intelligent auto sweep in system 214 to stop automatic movement of resources (e.g., funds) from one account to another. Additionally, or alternatively, the user may set a threshold limit on an amount to be transferred into an interlinked account, and the analytics system 216 may provide such a threshold limit to the intelligent auto sweep in system 214. In some embodiments, the analytics system 216 may provide input to the intelligent auto sweep in system 214 based on historical transactions, accounts owned by the user, accounts owned by friends and/or family, and/or the like.

In some embodiments, the customer event hub 218 may include a repository of historical events (e.g., transactions, resource distributions, and/or the like) associated with one or more users (e.g., customers), one or more accounts (e.g., sources), one or more merchants (e.g., entities), one or more payment vehicles (e.g., resource distribution devices), and/or the like, which may collectively be referred to as customer historical transaction data. For example, the customer event hub 218 may include data regarding the user, historical transactions associated with the user, one or more accounts associated with the user, one or more merchants associated with the user, one or more payment vehicles associated with the user, and/or the like. As shown in FIG. 2, the customer event hub 218 may provide the customer historical transaction data to the insight engine 220.

In some embodiments, the insight engine 220 may generate insights (e.g., based on the historical transaction data) for historical events. For example, to generate the insights, the insight engine 220 may analyze and/or extract meaningful information from the customer historical transaction data (e.g., from the customer event hub 218) by identifying patterns in the customer historical transaction data. As shown in FIG. 2, the insight engine 220 may provide the insights, patterns, and/or the like to the intent processor 222.

In some embodiments, the intent processor 222 may determine, based on the insights, patterns, and/or the like from the insight engine 220, a probability of a particular event occurring in the near future. Additionally, or alternatively, the intent processor 222 may determine a predicted transaction amount (e.g., a price, an amount of a resource distribution, how much money may be required, and/or the like) for the particular event. For example, the intent processor 222 may determine, based on a customer purchasing (e.g., booking) a one-way flight, a probability that the customer may purchase a return flight, a taxi ride, and/or the like. In some embodiments, the intent processor 222 may determine, based on determined probabilities for one or more events, a near future intent (e.g., a predicted future transaction), and determine, based on historical data and/or the like, a predicted transaction amount for the near future intent. As shown in FIG. 2, the intent processor 222 may provide the near future intent and/or the predicted transaction amount to the intelligent auto sweep in system 214.

In some embodiments, the intelligent auto sweep in system 214 may determine, based on the predicted transaction amount, if an account (e.g., account A1) does not have enough funds (e.g., too low of a balance) to complete the predicted future transaction. Additionally, or alternatively, the intelligent auto sweep in system 214 may transfer funds from one or more other accounts associated and/or interlinked with the account (e.g., account A2 and/or A3) to the account, such that, after the transfer, the account has enough funds to complete the predicted future transaction. For example, the resource management system, using the intelligent auto sweep in system 214, may utilize any combination of portions of the balances of account A1, account A2, and/or account A3 to achieve an amount of funds in account A1 to complete the predicted future transaction.

In some embodiments, the intelligent auto sweep in system 214 may transfer funds based on parameters (e.g., to prevent an excessive number of transfers). For example, the parameters may include event types, transaction categories, a time to reverse, a confidence factor, and/or the like.

The event types (e.g., of the predicted future transaction) may include temporary events and life events. For example, life events may include birthdays, anniversaries, and/or the like around or on which the resource management system may expect transactions, and the intelligent auto sweep in system 214 and/or the account aggregation layer 210 may ensure that funds are available in one or more accounts associated with a user before the actual transaction initiates. The transaction categories (e.g., of the predicted future transaction) may include travel, household, recurring, and/or the like.

The time to reverse may be a number of hours that pass after an amount is transferred from a first account to a second account before the amount is transferred back to the first account from the second account if the amount is not used by the second account. For example, if the resource management system, using the intelligent auto sweep in system 214 and/or the account aggregation layer 210, transfers an amount from account A2 and/or A3 to account A1 and the amount remains unutilized in account A1 for a number of hours defined by the time to reverse, the resource management system, using the intelligent auto sweep in system 214 and/or the account aggregation layer 210, may transfer the amount from account A1 back to account A2 and/or A3.

The confidence factor may be a confidence that the predicted future transaction will occur. In some embodiments, if the resource management system, using the intelligent auto sweep in system 214 and/or the account aggregation layer 210, transfers an amount from a first account to a second account and the amount is utilized from the second account, the confidence factor may increase. Additionally, or alternatively, if the resource management system, using the intelligent auto sweep in system 214 and/or the account aggregation layer 210, transfers an amount from a first account to a second account and the amount is not utilized from the second account, the confidence factor may decrease.

Figure 3:
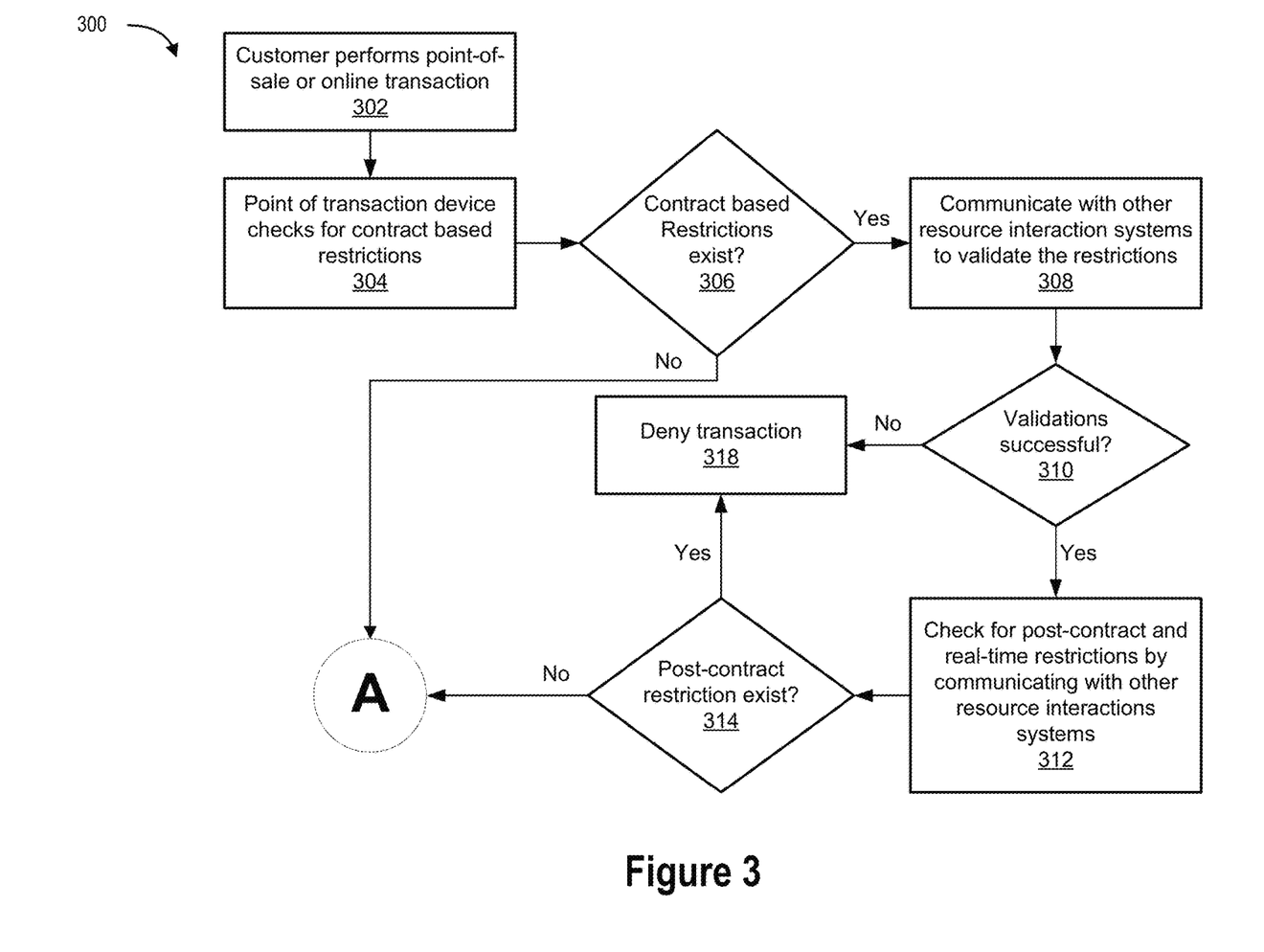
FIG. 3 is a flowchart of exemplary method for processing restriction-based interactions by performing multiple entity validations in accordance with one or more embodiments of the present invention.

FIG. 3 is a flowchart of exemplary method for processing restriction-based interactions by performing multiple entity validations in accordance with one or more embodiments of the present invention. As shown in block 302, the customer may perform a transaction (e.g., point-of-sale transaction or an online transaction). Upon initiation of the transaction, the point of transaction device may initiate a check for presence of contract based restrictions as shown in block 304. In some embodiments, prior to the customer performing or initiating the transaction, the system of the invention may communicate with multiple entities (e.g., entities associated with resource interaction systems or other third party entities that can provide data associated with the restrictions) to identify restrictions. For example, the system may communicate with merchants, entities comprising information associated with government policies, financial institutions, card networks, payment gateways, and/or the like to continuously check for restrictions associated with transactions. In some embodiments, the restrictions may be placed by the government organizations, customers, merchants, card networks, payment gateways, financial institutions, and/or the like. For example, the user may place the a transaction amount limit. In another example, the merchant may place product based restrictions such as selling a certain product to users in a certain stage of life (e.g., length of life less than 21 years). In another example, a government policy may restrict selling a certain product in some geographical locations. The system, upon identifying data related to such restrictions based on communicating with multiple entities, may formulate the restrictions (e.g., in the form of executable instructions, conditional statements, or the like) and register such restrictions. Registering the restrictions may comprise generating a contract for each of those identified restrictions. In some such embodiments, the system may transmit the generated contracts to point of transaction devices (e.g., point of sale devices, remote online platforms, and/or the like). In some embodiments, the system may generate contracts on a distributed ledger. In addition to the transmission of contracts, the system may also transmit executable instructions that cause the point of transaction devices to perform contract-based restriction checks on transactions that are initiated on the point of transaction devices.

Based on performing the contract based restriction check, the resource management system may check if any contract based restrictions exist as shown in block 306. If no, the system either completes the transaction in some cases or proceeds to implement process flow 400 of FIG. 4 or process flow 500 of FIG. 5. If yes, the system communicates with other resource interaction systems to validate the restrictions as shown in block 308. Communicating with other resource interaction systems may comprise extracting restriction information associated with the at least one registered restriction from an entity of the multiple entities associated with the at least one registered restriction, wherein the restriction information comprises at least one or more interaction conditions and validating if the resource interaction satisfies the one or more interaction conditions by extracting real-time data associated with the one or more interaction conditions and the resource interaction from the multiple entities. The one or more interaction conditions are placed by the entity associated with the at least one registered restriction based on at least one of user provided rules, location based regulations, product based regulations, service based regulations, interaction trends, and organization rules associated with the entity. For example, communicating with acquirer financial institution, issuer financial institution, resource distribution device networks (e.g., card networks), and/or other resource interaction systems linked with processing resource interactions to verify user information, validate transaction preferences, validate resource distribution device rules (e.g., card rules), validate interaction blocking rules (e.g., a merchant linked with malfeasance), verify interaction trends (e.g., checking if interaction doesn't meet previously identified trends) and/or the like. All of the resource interaction systems may not have all the information for validating or enforcing the restrictions and the system consolidates data available in different resource interaction systems to process the transaction. For example, the issuer financial institution may have information associated with validating the user information (e.g., date of birth) towards a purchase of a product that has a lifetime based restriction as the issuer financial institution may have an identity document submitted by the user during issuance of a resource distribution device. In another example, user's financial institution may have transaction preferences associated with the user that may linked to one or more resource distribution devices of the user. In another example, the card network may have information associated with verifying authenticity of a merchant linked with the transaction. The system may communicate with different resource interaction system to gather information required to enforce restrictions.

The system then checks if the validations are successful or not as shown in block 310. If the validations are not successful, the system denies the transaction as shown in block 318. If the validations are successful, the system checks for post-registration restrictions (e.g., restrictions identified at a timestamp after completion of registration process associated with the one or more registered restrictions as discussed in block 304) and/or real-time restrictions by communicating with other resource interactions systems as shown in block 312. Continuing with the example related to lifetime based restriction, the system may validate that the user's lifetime (e.g., year of birth) matches the lifetime limit in lifetime based restriction towards purchase of a product, the system may proceed to block 312.

The system then determines if the post-registration restrictions exist as shown in block 314. In some embodiments, the post-registration restrictions may be identified at a timestamp after completion of registration process associated with the one or more registered restrictions. For example, new restrictions may come into existence after the system generates and/or transmits the contracts, where the generation of contracts may happen every 4 weeks, or the like. To determine such new restrictions, the system may communicate in real-time with one or more resource interactions systems. If the system determines that the post-registration restrictions exist, the system denies the transaction as shown in block 318. In some cases, the system may perform additional validations associated with the post-contract restrictions similar to the validations performed in block 308 instead of denying the transaction. If the system determines that no post-registration restrictions exist, the system either approves and completes the transaction or proceeds to implement the process flow 400 of FIG. 4 or the process flow 500 of FIG. 5.

Figure 4:
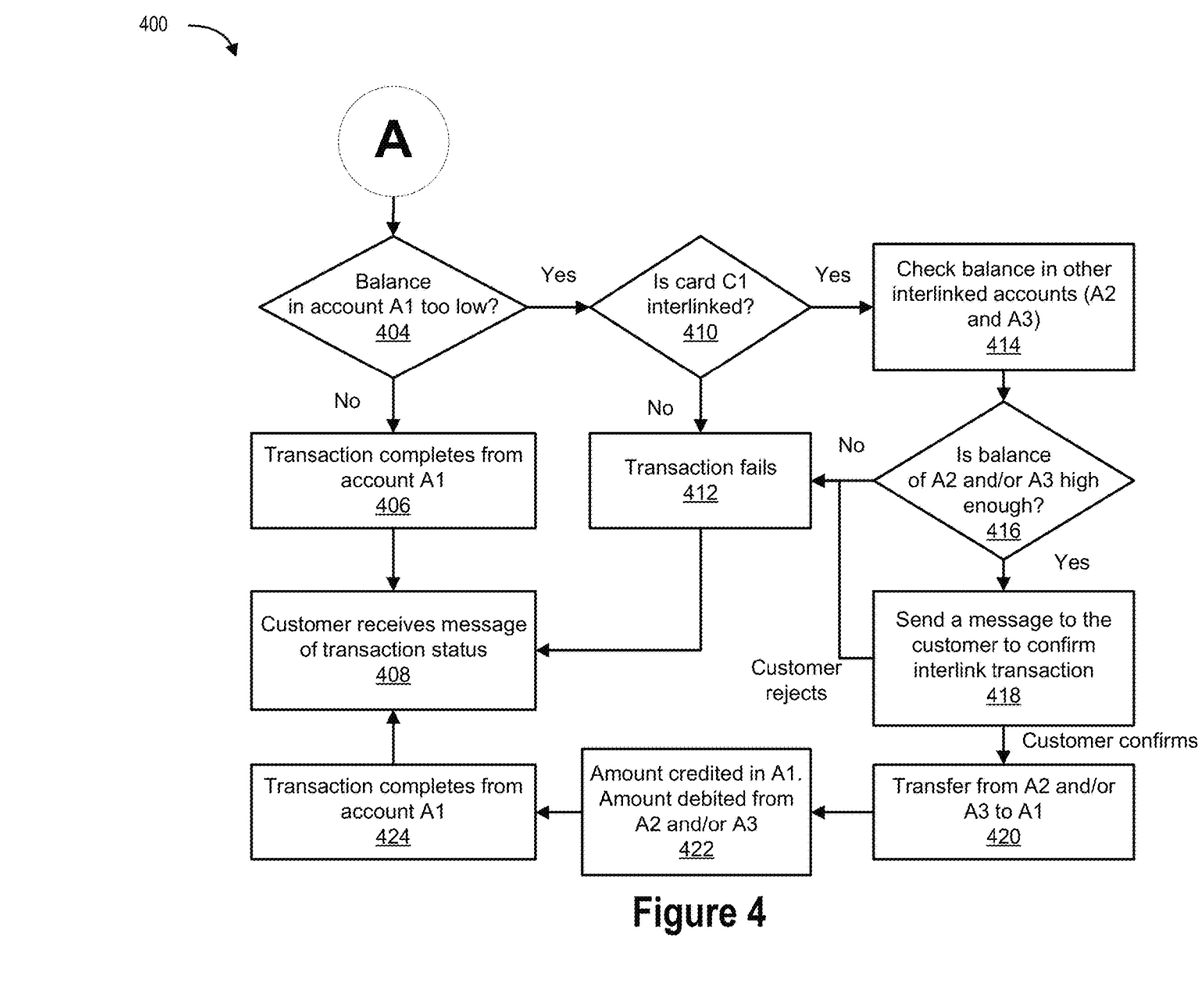
FIGS. 4 and 5 are flowcharts of exemplary methods for utilizing resources from multiple sources to complete a resource distribution in accordance with one or more embodiments of the present invention.

FIG. 4 is a flowchart of an exemplary method 400 for processing restriction-based interactions by performing multiple entity validations (e.g., using a book transfer architecture) in accordance with one or more embodiments of the present invention. In some embodiments, a resource management system, such as the resource management system described herein with respect to FIGS. 1-3, and/or internal systems of a financial institution may perform the method 400.

As shown in FIG. 4, prior to execution of steps in the method 400, the method may include a customer swiping a card C1 at a point-of-sale (e.g., a point of transaction device, a merchant's store, and/or the like) or performing an online transaction using card C1 and then performing the steps in process flow 300 as described in FIG. 3. Once the process flow proceeds from FIG. 3 to FIG. 4, the method 400 may further include determining whether a balance in account A1, associated with card C1, is too low to complete a transaction initiated by the customer (block 404). If the balance in account A1 is not too low, the method 400 may include completing the transaction from account A1 (block 406) and sending a message of the transaction status to the customer (block 408).

As shown in FIG. 4, if the balance in account A1 is too low, the method 400 may include determining if the card C1 is interlinked (block 410). If the card C1 is not interlinked, the method 400 may include denying the transaction such that the transaction fails (block 412) and sending a message of the transaction status to the customer (block 408).

As shown in FIG. 4, if the card C1 is interlinked, the method 400 may include determining and/or checking one or more balances in other interlinked accounts, such as accounts A2 and A3 (block 414). The method 400 may include determining whether balances of accounts A2 and/or A3 are high enough to complete the transaction (block 416). If the balances of accounts A2 and/or A3 are not high enough to complete the transaction, the method 400 may include denying the transaction such that the transaction fails (block 412) and sending a message of the transaction status to the customer (block 408).

As shown in FIG. 4, if the balances of accounts A2 and/or A3 are high enough to complete the transaction, the method 400 may include sending a message to the customer to confirm an interlink transaction (block 418) (e.g., as a check to prevent unauthorized transactions). If the customer rejects the interlink transaction, the method 400 may include denying the transaction such that the transaction fails (block 412) and sending a message of the transaction status to the customer (block 408).

As shown in FIG. 4, if the customer confirms the interlink transaction, the method 400 may include transferring funds (e.g., distributing resources) from account A2 and/or A3 to account A1 (block 420). The method 400 may include crediting an amount in account A1 and debiting the amount from account A2 and/or A3 (block 422). The method 400 may include completing the transaction from account A1 (block 424) and sending a message of the transaction status to the customer (block 408).

As noted above, the method 400 of FIG. 4 is merely an example, and other methods in accordance with the present invention may include additional steps, fewer steps, and/or other steps.

Figure 5:
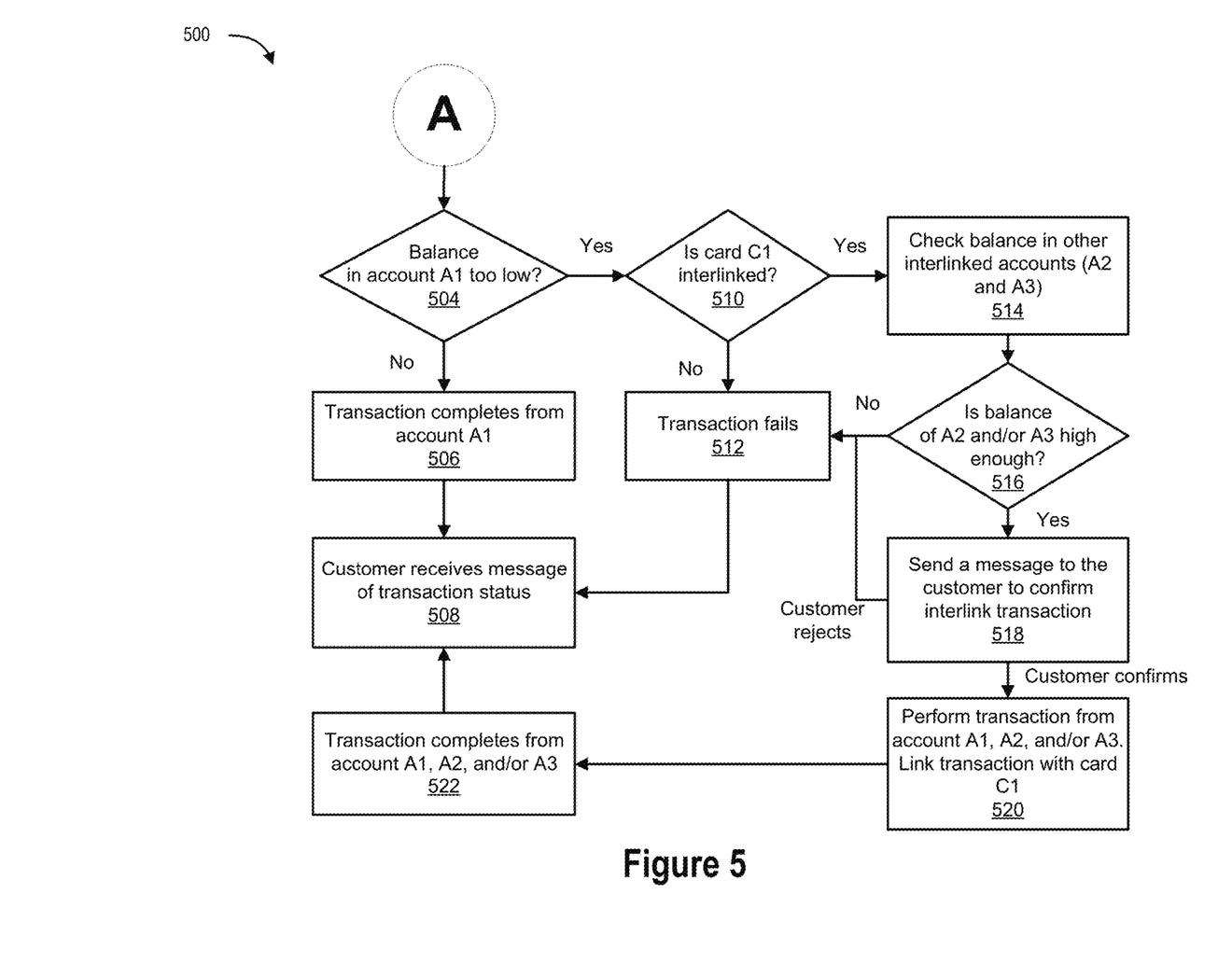

FIG. 5 is a flowchart of an exemplary method 500 for processing restriction-based interactions by performing multiple entity validations (e.g., using a multi-account usage architecture) in accordance with one or more embodiments of the present invention. In some embodiments, a resource management system, such as the resource management system described herein with respect to FIGS. 1-3, and/or internal systems of a financial institution may perform the method 500.

As shown in FIG. 5, prior to execution of steps in the method 500, the method may include a customer swiping a card C1 at a point-of-sale (e.g., a point of transaction device, a merchant's store, and/or the like) or performing an online transaction using card C1 and then performing the steps in process flow 300 as described in FIG. 3. Once the process flow proceeds from FIG. 3 to FIG. 5, the method 500 may further include determining whether a balance in account A1, associated with card C1, is too low to complete a transaction initiated by the customer (block 504). If the balance in account A1 is not too low, the method 500 may include completing the transaction from account A1 (block 506) and sending a message of the transaction status to the customer (block 508).

As shown in FIG. 5, if the balance in account A1 is too low, the method 500 may include determining if the card C1 is interlinked (block 510). If the card C1 is not interlinked, the method 500 may include denying the transaction such that the transaction fails (block 512) and sending a message of the transaction status to the customer (block 508).

As shown in FIG. 5, if the card C1 is interlinked, the method 500 may include determining and/or checking one or more balances in other interlinked accounts, such as accounts A2 and A3 (block 514). The method 500 may include determining whether balances of accounts A2 and/or A3 are high enough to complete the transaction (block 516). If the balances of accounts A2 and/or A3 are not high enough to complete the transaction, the method 500 may include denying the transaction such that the transaction fails (block 512) and sending a message of the transaction status to the customer (block 508).

As shown in FIG. 5, if the balances of accounts A2 and/or A3 are high enough to complete the transaction, the method 500 may include sending a message to the customer to confirm an interlink transaction (block 518) (e.g., as a check to prevent unauthorized transactions). If the customer rejects the interlink transaction, the method 500 may include denying the transaction such that the transaction fails (block 512) and sending a message of the transaction status to the customer (block 508).

As shown in FIG. 5, if the customer confirms the interlink transaction, the method 500 may include performing the transaction from account A1, A2, and/or A3 (e.g., using portions of funds, resources, and/or the like from account A1, A2, and/or A3) and linking the transaction with card C1

(block 520). The method 500 may include completing the transaction from account A1, A2, and/or A3 (block 522) and sending a message of the transaction status to the customer (block 508).

As noted above, the method 500 of FIG. 5 is merely an example, and other methods in accordance with the present invention may include additional steps, fewer steps, and/or other steps.

Figure 6A:
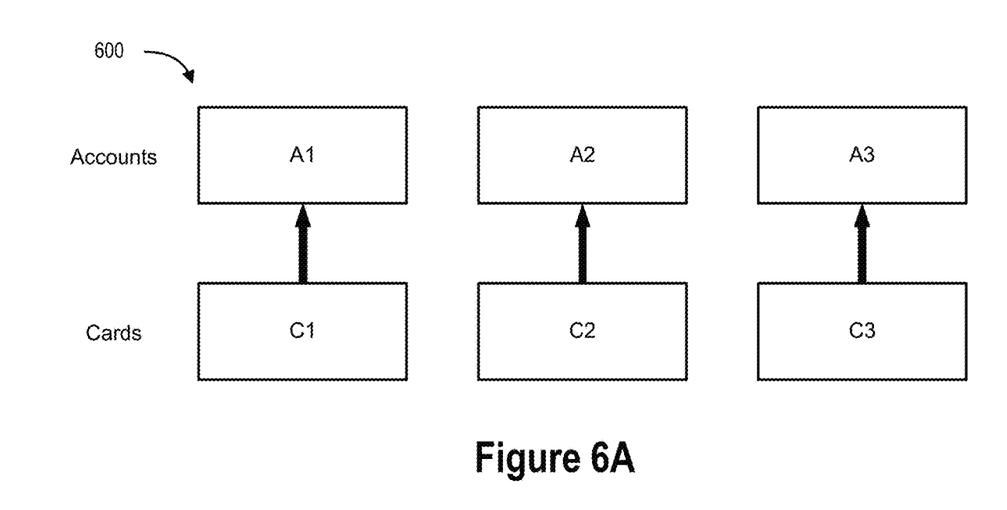
FIGS. 6A and 6B are schematic diagrams of example embodiments of processing transactions utilizing resources from multiple sources, in accordance with one or more embodiments of the present invention.
Figure 6B:
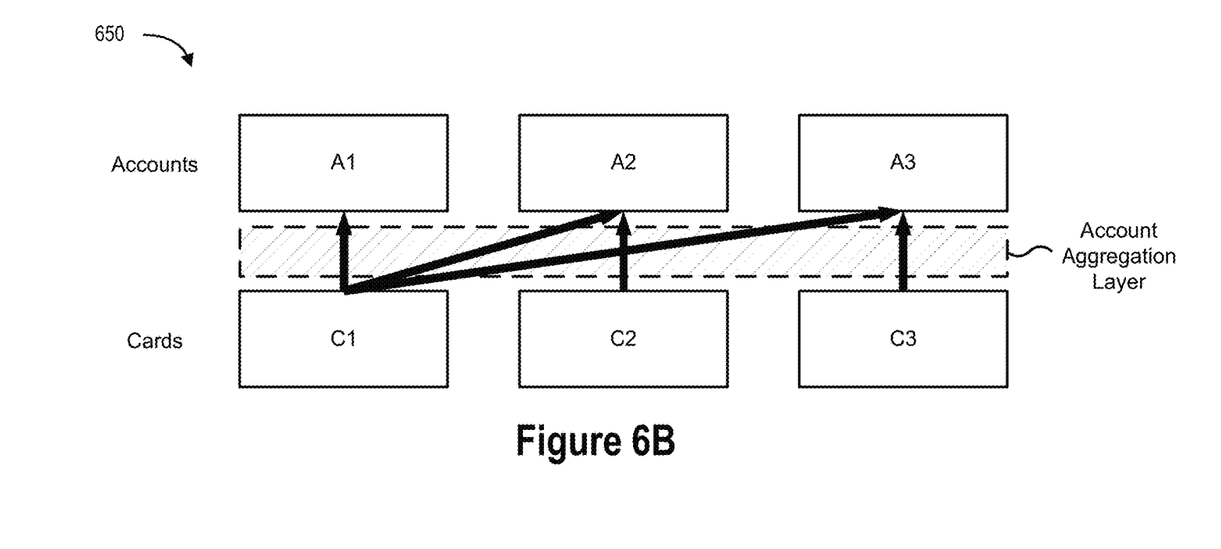

In some embodiments, a user (e.g., a customer) may attempt to pay for a transaction with a merchant using a card (e.g., a credit card, a debit card, and/or the like) or another payment vehicle that may be associated with (e.g., linked to) an account. For example, and as shown in an example embodiment 600 of FIG. 6A, the user may have three accounts A1, A2, and A3 and three cards C1, C2, and C3. As shown in FIG. 6A, card C1 may be associated with account A1, such that when the user provides card C1 to a merchant and the merchant attempts to process the transaction based on the card C1, funds from account A1 are used to complete the transaction. Cards C2 and C3 may be associated with and/or linked to accounts A2 and A3, respectively, in a similar manner. In the example embodiment 600 of FIG. 6A, if account A1 does not have enough funds (e.g., too low of a balance) to complete the transaction, the merchant will be notified (e.g., by a financial institution managing account A1) that the transaction cannot be completed, even if account A2 and/or account A3 has enough funds to complete the transaction. As previously noted, denied transactions (e.g., distribution requests) consume computing resources (e.g., processing resources, memory resources, power resources, communication resources, and/or the like) and/or network resources.

In some embodiments, the resource management system may permit a user to associate a card and/or payment vehicle with multiple accounts (e.g., sources). For example, and as shown in an example embodiment 650 of FIG. 6B, card C1 may be associated with account A1, A2, and A3. In some embodiments, the resource management system may include an account aggregation layer to associate a card and/or payment vehicle with multiple accounts. In the example embodiment 650 of FIG. 6B, when the user provides card C1 to a merchant and the merchant attempts to process the transaction based on the card C1, if account A1 does not have enough funds (e.g., too low of a balance) to complete the transaction, the resource management system (e.g., using the account aggregation layer) may utilize funds from account A1, account A2, and/or A3 to complete the transaction. For example, the resource management system may utilize any combination of portions of the balances of account A1, account A2, and/or account A3 to complete the transaction.

In some embodiments, the resource management system, using the account aggregation layer and/or an intelligent auto sweep in system, may execute limit checks, unauthorized access rules, other checks, and/or the like. Additionally, or alternatively, the resource management system, using the account aggregation layer and/or an intelligent auto sweep in system, may make, based on historical data, predictive transfers from other accounts so that enough funds remain in an account as described further herein.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a non-transitory, computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with selective authorization of resource usage based on geographic positioning and usage category information associated with a resource interaction system.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing restriction-based interactions by performing multiple entity validations, comprising:
   at least one processing device;
   at least one memory device; and
   a module stored in the at least one memory device comprising executable instructions that when executed by the at least one processing device, cause the at least one processing device to:
      identify initiation of a resource interaction at a point of interaction device by a user;
      cause the point of interaction device to perform a registered restriction check on the resource interaction to check for one or more registered restrictions;
      identify at least one registered restriction associated with the resource interaction based on performing the registered restriction check;
      perform consolidated multiple entity validations associated with the at least one registered restriction by communicating with multiple entities associated with processing the resource interaction;
      determine if the consolidated multiple entity validations are successful; and
      allow or deny the resource interaction based at least in part on determining if the consolidated multiple entity validations are successful.

2. The system according to claim 1, wherein the executable instructions cause the at least one processing device to:
   perform a dynamic post-registration restriction check by communicating with the multiple entities associated with processing the resource interaction; and
   determine if the post-registration restriction check is successful to allow or deny the resource interaction.

3. The system according to claim 2, wherein the post-registration restriction check is associated with post-registration restrictions that are identified at a timestamp after completion of registration process associated with the one or more registered restrictions.

4. The system according to claim 2, wherein the executable instructions cause the at least one processing device to perform the post-registration restriction check based on communicating with the multiple entities in real-time to identify any real-time post-registration restrictions.

5. The system according to claim 1, wherein the executable instructions cause the at least one processing device to perform the consolidated multiple entity validations based on:
   extracting restriction information associated with the at least one registered restriction from an entity of the multiple entities associated with the at least one registered restriction, wherein the restriction information comprises at least one or more interaction conditions;
   validating if the resource interaction satisfies the one or more interaction conditions by extracting real-time data associated with the one or more interaction conditions and the resource interaction from the multiple entities.

6. The system according to claim 4, wherein the one or more interaction conditions are placed by the entity associated with the at least one registered restriction based on at least one of user provided rules, location based regulations, product based regulations, service based regulations, interaction trends, and organization rules associated with the entity.

7. The system according to claim 1, wherein the executable instructions cause the at least one processing device to:
   extract data associated with interaction restrictions from the multiple entities and third party entities;
   formulate one or more restrictions based on the data; and
   register the one or more restrictions as the one or more registered restrictions.

8. A computer program product for processing restriction-based interactions by performing multiple entity validations, comprising a non-transitory computer-readable storage medium having computer-executable instructions for:
   identifying initiation of a resource interaction at a point of interaction device by a user;
   causing the point of interaction device to perform a registered restriction check on the resource interaction to check for one or more registered restrictions;
   identifying at least one registered restriction associated with the resource interaction based on performing the registered restriction check;
   performing consolidated multiple entity validations associated with the at least one registered restriction by communicating with multiple entities associated with processing the resource interaction;

determining if the consolidated multiple entity validations are successful; and allowing or denying the resource interaction based at least in part on determining if the consolidated multiple entity validations are successful.

9. The computer program product according to claim 8, wherein the non-transitory computer-readable storage medium comprises computer-executable instructions for:

performing a dynamic post-registration restriction check by communicating with the multiple entities associated with processing the resource interaction; and determining if the post-registration restriction check is successful to allow or deny the resource interaction.

10. The computer program product according to claim 9, wherein the post-registration restriction check is associated with post-registration restrictions that are identified at a timestamp after completion of registration process associated with the one or more registered restrictions.

11. The computer program product according to claim 9, wherein the non-transitory computer-readable storage medium comprises computer-executable instructions for performing the post-registration restriction check based on communicating with the multiple entities in real-time to identify any real-time post-registration restrictions.

12. The computer program product according to claim 8, wherein the non-transitory computer-readable storage medium comprises computer-executable instructions for performing the consolidated multiple entity validations based on:

extracting restriction information associated with the at least one registered restriction from an entity of the multiple entities associated with the at least one registered restriction, wherein the restriction information comprises at least one or more interaction conditions;

validating if the resource interaction satisfies the one or more interaction conditions by extracting real-time data associated with the one or more interaction conditions and the resource interaction from the multiple entities.

13. The computer program product according to claim 12, wherein the one or more interaction conditions are placed by the entity associated with the at least one registered restriction based on at least one of user provided rules, location based regulations, product based regulations, service based regulations, interaction trends, and organization rules associated with the entity.

14. The computer program product according to claim 8, wherein the non-transitory computer-readable storage medium comprises computer-executable instructions for:

extracting data associated with interaction restrictions from the multiple entities and third party entities;

formulating one or more restrictions based on the data; and registering the one or more restrictions as the one or more registered restrictions.

15. A computerized method for processing restriction-based interactions by performing multiple entity validations, the method comprising:

identifying initiation of a resource interaction at a point of interaction device by a user;

causing the point of interaction device to perform a registered restriction check on the resource interaction to check for one or more registered restrictions;

identifying at least one registered restriction associated with the resource interaction based on performing the registered restriction check;

performing consolidated multiple entity validations associated with the at least one registered restriction by communicating with multiple entities associated with processing the resource interaction;

determining if the consolidated multiple entity validations are successful; and allowing or denying the resource interaction based at least in part on determining if the consolidated multiple entity validations are successful.

16. The computerized method according to claim 15, wherein the method comprises:

performing a dynamic post-registration restriction check by communicating with the multiple entities associated with processing the resource interaction; and determining if the post-registration restriction check is successful to allow or deny the resource interaction.

17. The computerized method according to claim 16, wherein the post-registration restriction check is associated with post-registration restrictions that are identified at a timestamp after completion of registration process associated with the one or more registered restrictions.

18. The computerized method according to claim 16, wherein the method comprises performing the post-registration restriction check based on communicating with the multiple entities in real-time to identify any real-time post-registration restrictions.

19. The computerized method according to claim 15, wherein performing the consolidated multiple entity validations is based on:

extracting restriction information associated with the at least one registered restriction from an entity of the multiple entities associated with the at least one registered restriction, wherein the restriction information comprises at least one or more interaction conditions;

validating if the resource interaction satisfies the one or more interaction conditions by extracting real-time data associated with the one or more interaction conditions and the resource interaction from the multiple entities.

20. The computerized method according to claim 19, wherein the one or more interaction conditions are placed by the entity associated with the at least one registered restriction based on at least one of user provided rules, location based regulations, product based regulations, service based regulations, interaction trends, and organization rules associated with the entity.

* * * * *